No. 784,824. PATENTED MAR. 14, 1905.
D. S. WILSON.
MULTIPLE DRIVING REINS.
APPLICATION FILED AUG. 30, 1904.
2 SHEETS—SHEET 2.
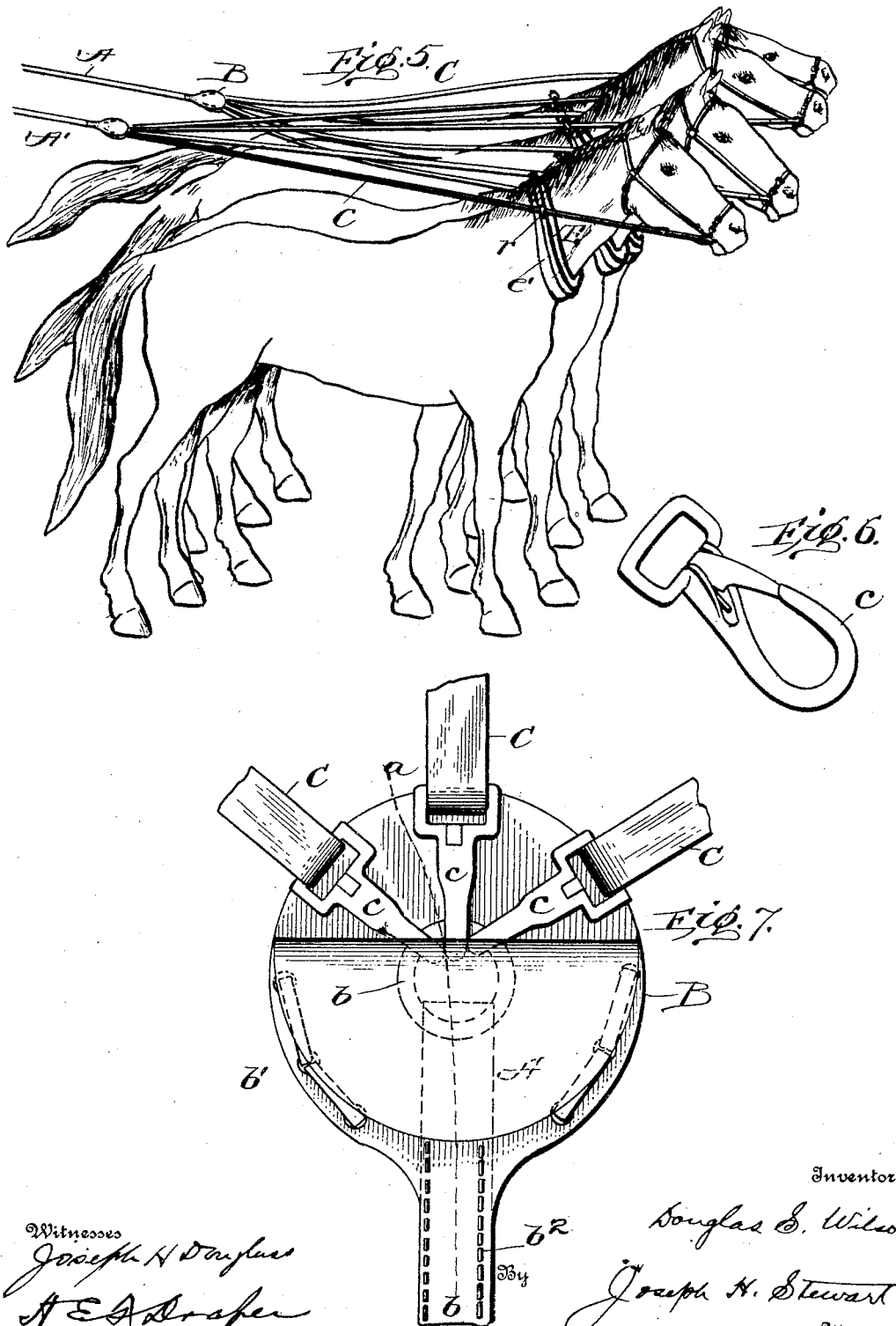

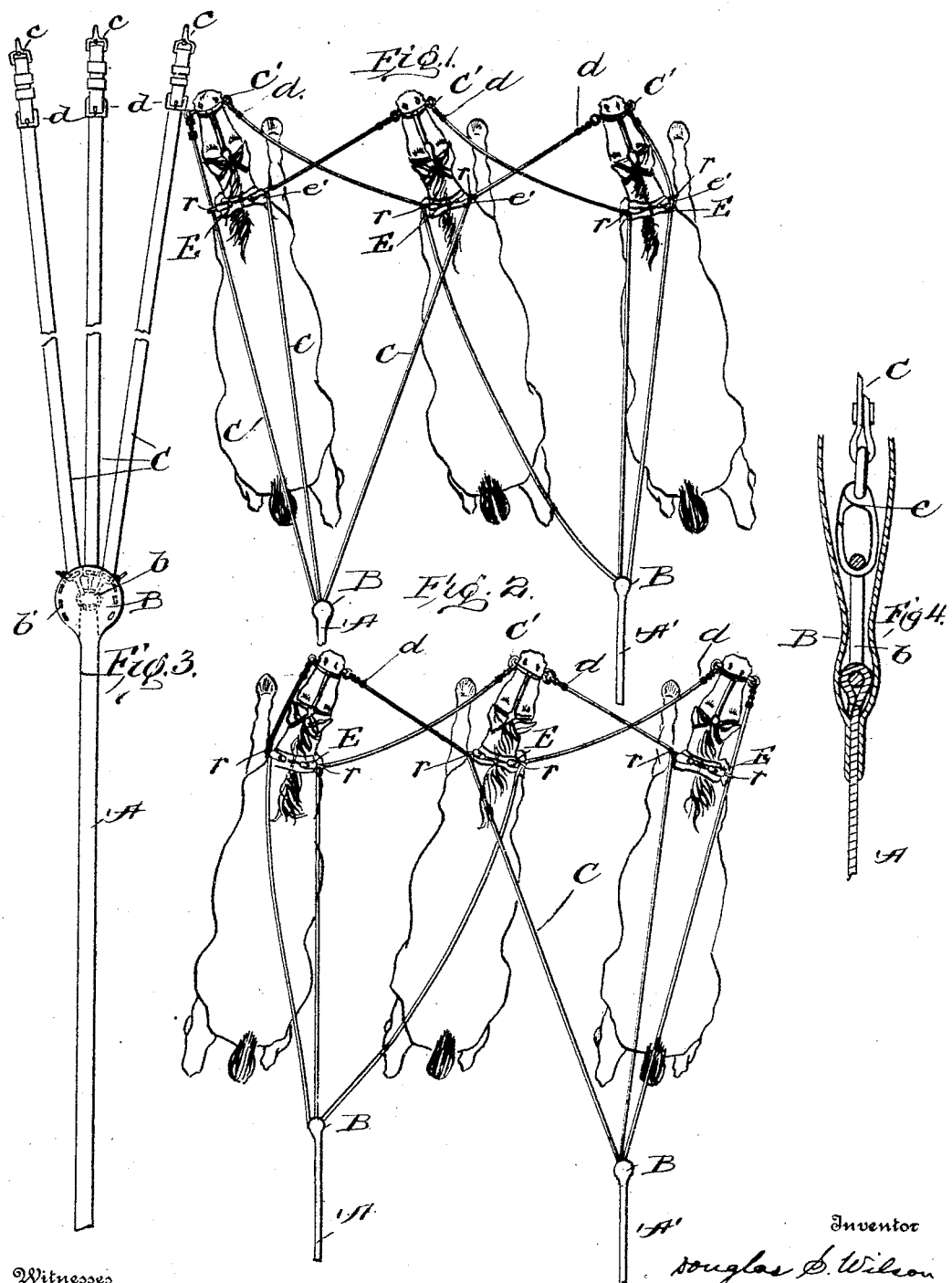

No. 784,824.

Patented March 14, 1905.

UNITED STATES PATENT OFFICE.

DOUGLAS S. WILSON, OF MOUND BAYOU, MISSISSIPPI.

MULTIPLE DRIVING-REINS.

SPECIFICATION forming part of Letters Patent No. 784,824, dated March 14, 1905.

Application filed August 30, 1904. Serial No. 222,693.

*To all whom it may concern:*

Be it known that I, DOUGLAS S. WILSON, a citizen of the United States, residing at Mound Bayou, in the county of Bolivar and State of Mississippi, have invented certain new and useful Improvements in Multiple Driving-Reins, of which the following is a specification, reference being had to the accompanying drawings, wherein similar letters represent similar parts, and in which—

Figure 1 is a diagrammatic view of my device, illustrating a three-horse team being guided to the left. Fig. 2 is a similar view showing the same being guided to the right. Fig. 3 is a plan view of one of the reins with its three leaders attached. Fig. 4 is a detail section view on line $a\,b$ of Fig. 7, showing the manner of attaching the leaders to the rein. Fig. 5 is a view of my reins applied to a four-horse team. Fig. 6 is a detail view of my snap-hook. Fig. 7 is a plan view of the ring-holder with the cover partly turned back.

The object of my invention is to produce a pair of reins adapted for driving teams of three or more horses, so that the direction of travel may be communicated to each animal without subjecting the latter to undue injury because of its teamwork.

It is well known that in ordinary cases where draft-animals are driven in teams of more than two hitched up side by side the communication to each animal of the information of the direction in which the driver wishes the team to go is made through a system of multiple reins more or less complicated in construction and cumbersome in management, resulting almost invariably in unnecessary injury to the animal's mouth, and this is due wholly to the fact that the direction of motion is transmitted to the mouth of each animal not directly from the hands of the driver, but through a bunglesome system of reins and checks, each of which intensifies the strain upon the bit applied to the mouth of each animal, so that in the aggregate it practically results in subjecting the mouth of each animal in the team to the sum-total of strain on all the other animals. The nature of my invention is intended to minimize this difficulty, and this object is accomplished by the particular construction of reins described in the following specification.

Referring now by letter to the details of the drawings, A A' represent the driving-reins, to which are connected, by means of the connecting-ring holder B, the branching reins C, (previously called "leaders,") which latter are in turn secured to the mouth of the animals by the bit-rings C'. The connecting-ring holder B is composed of two leather disks secured together by stitching the edges, as shown at $b'$, leaving an open space at front between the two disks, through which the ends of the branching reins are passed for engagement with the connecting-ring $b$ through their respective snap-hooks, as shown in Figs. 3 and 7. In this latter figure the ring-holder is shown with its top disk turned back in order to illustrate more clearly the position of the snap-hooks and the ring by means of which the ring-holder and the branching reins are held together. This figure also shows at $b^2$ the additional stitching by means of which the ring-holder B is secured to the main driving-reins A A' and the manner in which the ring $b$ is attached to the outer end of the main driving-rein A. It will thus be seen that the construction of the ring-holder and the manner of attaching the branching reins (hereinafter referred to) thereto are adapted to secure positive, direct, and certain transmission of the force of pull from the main driving-rein through the branching reins to the bits. This is a distinct advantage over those structures in which the branching reins are connected to the main dividing-rein by block or pulley, since in the latter case the branching reins are apt to slip or become inoperative through undue accumulation of dirt or rust, and thus misdirect or misguide the pull of the driver—a circumstance which might at times be fraught with serious consequences to driver and team.

The branching reins are arranged in two sets of three each, adapting them for use with a three-horse team. One set is connected to the right driving-rein A' and the other to the left driving-rein A.

The driving-reins, the connecting-ring holder, and the branching reins are all made of leather or similar material. Each of the branching reins has at its inner end a snap-hook $c$ of the usual construction, as shown in Fig. 6, by means of which it is fastened to the connecting-ring $b$ within the ring-holder B, while at its outer end each of said branching reins is provided with an adjusting-buckle $d$ for varying the length of said reins and a snap-hook $c$ for connection with the bit-ring C' at one side of the animal's mouth. The buckle $d$, the snap-ring $c$, the bit C', and the headstall and nose-band of the bridle may all be of the usual construction.

In Fig. 4 is shown in sectional detail the relative position of the upper and lower disks of the ring-holder, the ring, the snap-hook, the main driving-reins, and the branching reins.

E represents the hames on the collars $e'$, both of ordinary construction. On each side of the hame E is a guide-ring $r$, through which the branching reins are passed to the bit-rings.

The operation of my device is clearly obvious from the detail description of the construction of the parts as given above. Speaking specially with reference to Figs. 1 and 2, it will be seen that the set of branching reins on the left-hand side guides the team to the left. The outer one of said branching reins leads directly and in a straight line from the ring-holder B at the outer end of the main driving-rein A through the guide-ring $r$ on the left hame to the left bit-ring at the animal's mouth. This driving-rein is held taut to incline the head of the animal to the left. A similar effect is produced at the left side of the middle animal through the middle branching rein, which is drawn taut through the right guide-ring on the animal to the left, and, lastly, the right branching rein of the same set is drawn taut against the left side of the third animal in the team through the guide-ring $r$ on the right side of the second or middle animal in the team. In this position of the branching reins referred to it will be seen that each of the branching reins extending from the right ring-holder B is loose, thereby presenting no resistance to the turn of the animal's head in the direction indicated by the pull on the left-hand set of branching reins. The effect of this arrangement is that by a slight inward pull on the left-hand driving-rein each of the branching reins will immediately exert a direct pull at the left side of the mouth of the animal to which said branching rein is fastened, and as the branching rein which connects the right bit-ring of each animal with the main driving-rein is held loosely these right-hand branching reins exert no counter strain whatever on the animals' mouths. By this arrangement the pull is exerted at the mouth of each animal directly from the single branching rein attached at the side in the direction in which the animal is to go and is in no way intensified by the other reins connecting it with the other animals of the team.

In Fig. 2 is clearly shown that a pull on the right-hand driving-rein A' will exert the pressure in the same manner as in Fig. 1, except that the right branching reins will be taut, while the left will be loose, thus guiding the team to the right.

In Fig. 5 a similar arrangement of branching reins is shown, with the exception that said branching reins are four in number instead of three, adapting them to a four-horse team. If more than four horses are arranged side by side, each additional horse will have an additional rein, and the alternating arrangement of said branching reins will effect the guiding of the teams in the manner above described. While this arrangement of driving-reins is applicable to all teams in which two or more horses are arranged side by side, as in plowing and other farming utilities, it is also applicable to circus and other exhibition teams, such as chariot-teams and the like. The branching reins C are rendered adjustable in length by the buckles $d$ at the outer ends.

Having described my invention, what I claim, and desire to secure by Letters Patent, is—

1. A driving apparatus consisting, in combination, of main driving-reins A, A' connecting-ring holders, B, which latter are composed of two disk-like pieces attached to each other and to the main driving-reins by stitching; ring $b$ inclosed in said ring-holder, branching reins C, provided at each end with snap-hooks for attachment respectively to the ring in the ring-holder and to the ring-bit in the animal's mouth, whereby the movement of the ring-holder is transmitted positively and directly to each of the branching reins, all substantially as described.

2. The combination of main driving-reins, connecting-rings, ring-holders, branching reins, each of the latter being provided with snap-hooks and buckles, whereby the movement of the ring-holder is transmitted positively and directly to each of the branching reins, guide-rings secured to the hames on the collars, and bit-rings secured to the bits, the arrangement of said parts being such that each of the branching reins attached to the ring-holder of the left-hand main driving-rein will connect directly with the left bit-ring of each animal in the team, while the branching reins connected to the ring-holder of the right-hand main driving-rein is connected directly to the bit-ring at the right side of each animal in the team, each of the branching rings passing through its respective guide-ring on the hame substantially as described.

In testimony whereof I affix my signature in presence of two witnesses.

DOUGLAS S. WILSON.

Witnesses:
FRANK A. ANDERSON,
WILLIAM HAWKINS.